United States Patent [19]

Cioci

[11] Patent Number: 4,992,012
[45] Date of Patent: Feb. 12, 1991

[54] APPARATUS FOR THE UNIVOCAL AND AUTOMATIC POSITIONING AND BLOCKING ON THE NOSE OF THE SPINDLE OF A TOOL MACHINE AND THE LIKE OF MECHANISMS FOR VARIOUS CHIP REMOVAL MECHANICAL WORKINGS

[75] Inventor: Mauro Cioci, Florence, Italy
[73] Assignee: Bakuer Italiana S.P.A., Florence, Italy
[21] Appl. No.: 490,541
[22] Filed: Mar. 5, 1990

Related U.S. Application Data

[63] Continuation of Ser. No. 363,494, Jun. 8, 1989, abandoned.

[30] Foreign Application Priority Data

Jun. 21, 1988 [IT] Italy ................................ 9430 A/88

[51] Int. Cl.$^5$ .............................................. B23B 47/00
[52] U.S. Cl. ....................................... 409/136; 408/56
[58] Field of Search ............................. 408/56, 57, 59; 409/135, 136, 231; 29/560, 566

[56] References Cited

U.S. PATENT DOCUMENTS

| | | | |
|---|---|---|---|
| 4,557,643 | 12/1985 | Cioci ................................... | 409/136 |
| 4,578,003 | 3/1986 | Eckle .................................... | 408/56 |
| 4,624,043 | 11/1986 | Bennett ................................. | 29/568 |
| 4,642,005 | 2/1987 | Kondo et al. ................... | 408/239 R |
| 4,652,189 | 3/1987 | Mizoguchi ........................... | 408/56 |
| 4,679,970 | 7/1987 | Lohneis et al. ....................... | 408/57 |
| 4,795,293 | 1/1989 | Mizoguchi ........................... | 408/59 |

Primary Examiner—Daniel W. Howell
Attorney, Agent, or Firm—McGlew and Tuttle

[57] ABSTRACT

A spindle mounted accessory holder block is fixed to extend across the nose of the tool machine at a spaced location from the main bore of the rotatable spindle in which the main operating device is positioned. The block has an outer face with a plurality of seats defined therein each being spaced at a specific radial distance from the main bore and each providing a mounting for a pin holder of an accessory mechanism. For this purpose the block is provided with two or more inwardly extending seats each having holes therein forming passages providing the connection for a medium associated with the accessory, for example, compressed air or similar fluid. The holes in the seats of the block provide means for mounting a pin or pipe connection for the accessory which may be positioned at a spaced radial location from the main operating mechanism by mounting it in a selective hole of the block.

9 Claims, 1 Drawing Sheet

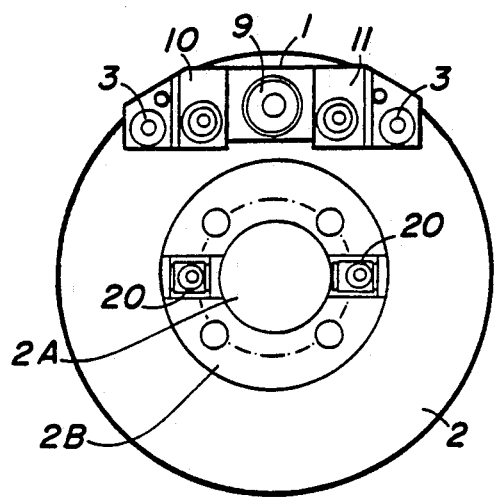
FIG.1
FIG.3
FIG.2
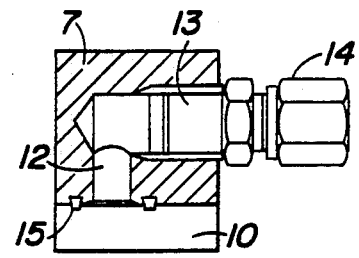
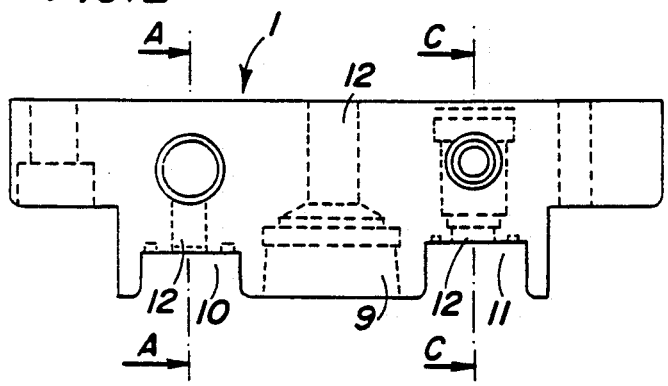
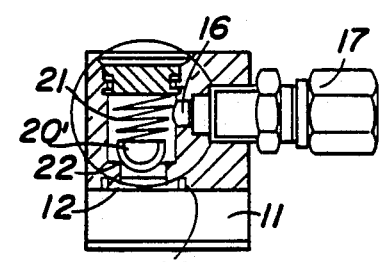
FIG.4
FIG.5
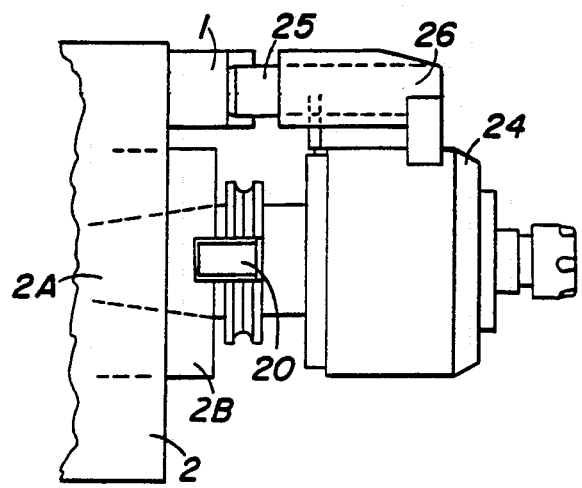

APPARATUS FOR THE UNIVOCAL AND AUTOMATIC POSITIONING AND BLOCKING ON THE NOSE OF THE SPINDLE OF A TOOL MACHINE AND THE LIKE OF MECHANISMS FOR VARIOUS CHIP REMOVAL MECHANICAL WORKINGS

This is a file wrapper continuation Application of Application Ser. No. 363,494 filed June 8, 1989, now abandoned.

FIELD AND BACKGROUND OF THE INVENTION

This invention relates in general to holder blocks and particularly to a new and useful holder block for a generic operating mechanism which is operatively fitted in the conical bore of the spindle of tool machines and wherein the holder block comprises a block member having a plurality of seats at selective spacings from the main bore providing a mounting element for an accessory.

The present invention particularly relates to an apparatus for positioning and blocking mechanisms provided for different chip-cutting workings which are equipped with a fixed pin having a predetermined center distance, such as milling angle-headstocks, revolutions multipliers, multi-spindle headstocks, oil feed holders, cones cleaners, all of which are brought, by means of toolholder moving means, onto the spindle note of machines such as a tool machine, numerical control machine, machining centers, etc.

It is known that many machining centers, as well as numerical control machines or traditional tool machines, are provided with toolholder moving means able to sequentially pick up from stock the various mechanisms having a different operative tool, and to locate them in a predetermined and steady position on the machine spindle nose and insert them into a central hole thereof. All these devices necessarily comprise a fixed outer casing, being provided either because such casing is an element of the internal kinematic unit, such as in revolutions multipliers, or because it makes up the container of other rotating parts, such as in oil feed holders. It is thus necessary to provide different holder blocks on the machine nose and block their outer casing, with respect to the spindle rotation.

Until now, these functions have been fulfilled by a seat provided in the machine nose or by a block fixed on the machine, whose distance from the spindle axis is equal to the center distance of the mechanism to be blocked and thereby capable of receiving and blocking the corresponding pin. Such systems restrictively allow only a type of mechanism to be applied to the machine or calls for replacing the block along with the type of mechanism as this may even require a different feeding (e.g. oil or compressed air). This prevents a full automation of the chip-removal working processes thereby contrasting with the advantages obtained by the use of the mechanical arm.

SUMMARY OF THE INVENTION

The present invention has the purpose of eliminating the above mentioned drawbacks by providing a holder block which allows the positioning and blocking of a plurality of different mechanisms, having predetermined center spacing distances, as well as their feeding with fluid such as oil, compressed air, etc.

This result has been achieved according to the invention by providing an apparatus which includes a block of irregular prismatic shape to be fixed on the front part or end of a machine spindle or nose and inscribed in the perimeter thereof. The block includes a front face shaped in steps forming corresponding seats spaced away from the axis of rotation in order to allow, in each seat of the block, the housing and blocking of a support or holder pin of an individual operative mechanism which is operatively fitted in a conical hole of the spindle nose.

Advantageously, the seat provided at the center of the block is of truncated-cone shape to allow for the positioning of milling angle headstocks and, moreover, the block is provided with one or more conduits leading into the center of each seat of the block allowing the inflow of an operative fluid in the hollow pin of the corresponding mechanism positioned and blocked therein.

According to another feature, at least one of the conduits is provided with a sealing ball or check valve which cooperates with the fitted pin of the relevant mechanism to open or close off operative medium flow.

The solution proposed by the present invention allows the positioning and blocking of selected mechanisms equipped with an outer fixed casing and having standard rotational center spacings and which apparatus is also applicable to any type of chip-cutting tool machine or similar machining center.

In accordance with the invention a holder block for a tool machine with rotatable spindle which has a main bore for receiving a generic operating mechanism includes a block secured to a stationary end of the machine nose at a spaced location from the bore of the spindle, the block having an outer face with a plurality of seats each having a bore transversely spaced inwardly extending associated mechanism.

A further object of the invention is to provide a tool holder which is simple in design, rugged in construction and economical to manufacture.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which preferred embodiments of the invention are illustrated.

BRIEF DESCRIPTION OF THE DRAWINGS

In the drawings:

FIG. 1 is a front elevational view of a tool machine spindle nose provided with an apparatus for the positioning and blocking of three separate mechanisms for chip-cutting workings, constructed according to the invention.

FIG. 2 is an enlarged side elevational view of the block of FIG. 1;

FIG. 3 is a section taken on line A—A of FIG. 2;

FIG. 4 is a section taken on line C—C of FIG. 2;

FIG. 5 is a partial side elevational view of FIG. 1, with the application of a revolutions multiplier.

DESCRIPTION OF THE PREFERRED EMBODIMENTS

Referring to the drawings in particular the invention embodied therein comprises a device such as a holder block to be fixed on a stationary machine nose 2, the rotatable spindle 2B of which has a main bore 2A in which a generic operating mechanism 24 is positioned.

In accordance with the invention, the block holder includes a block generally designated 1 which has an outer face into which is formed a plurality of seats or recesses 9, 10 and 11. In accordance with the invention, the seats 9, 10 and 11 have inwardly extending holes or bores 12 which define transversely spaced inwardly extending associated mechanism holder receiving bores 12. These receiving bores 12 form communication ducts for facilitating the positioning of accessories such as a conduit 13 of a pipe 14 which for example can supply an accessory mechanism such as the mechanism 25 and 26 on the associated block 1 so that it may function in respect to a generic mechanism 24.

Reduced to its essential structure and with reference to FIGS. 1 and 2 of the attached drawings, an apparatus according to the invention, for positioning and blocking chip-cutting work mechanisms on the rotatable spindle 2b of a tool machine provided with means 20 for transmitting the spindle rotative motion to the movable parts of associated mechanisms, comprises a block 1 having an irregular prismatic shape fixed on the front end of the nose of the machine 2 by two spaced apart side screws 3, inscribed in its perimeter, a front face of the block is step developed with three corresponding seats, a central seat 9 and two side seats 10 and 11. Each seat is provided with a base forming a passage 12 whose respective axes are parallel to that of the spindle 2b and are disposed on a common circumferential line which is concentric to the spindle axis. The radius of each provide a center spacing of the associated mechanisms.

As shown in FIG. 2, a central seat 9 is a truncated-cone cavity allowing the positioning of milling angle headstocks, and the two side seats 10 and 11 are cavities of rectangular cross-section having a hole 12 of a size in correspondence to a pin belonging to particular operative mechanisms.

As shown in FIG. 3, the hole 12 of seat 10 leads into a conduit 13 inside the same block 1 at the end of which a threaded fitting of a pipe 14 is connected in order to feed fluid, such as cutting oil necessary for some types of mechanisms such as the oil feed holders. An outlet seat is provided by an O-ring gasket 22 cooperating with a ball mechanism-blocking means 20' which is also provided with an inner hole for the transit of fluid through its fitting 17. As shown in FIG. 4, the hole 12 of seat 11 leads into a conduit 16 inside the same block 1 at the end of which the threaded fitting 17 is connected for feeding fluid, such as compressed air, as necessary for some types of mechanisms such as cone cleaners and others.

The conduit 16 is advantageously provided with a closing valve made up of a ball 20' which is pushed by a spring 21 against an internal "O-Ring" gasket to automatically close the mouth of hole 12. The ball 20' is lifted, by overcoming the biasing force of the spring 21, by a pin (not shown) of a respective mechanism to be introduced into hole 12, e.g. to allow the opening of the compressed air feeding circuit; also in this case, the outlet seal is provided by an 0-ring gasket 23 which cooperates with the mechanism blocking means which is also provided with an internal conduit for the flow of fluid through its pin.

As shown in FIG. 5 of the attached drawings, a generic mechanism 24, such as a revolutions multiplier, is picked up from the tools store by a mechanical arm (not shown for sake of clarity), always on the same predetermined position with respect to the relevant receiving and blocking seat of block 1, which seat is, in this case, the one indicated by 10, so that when the mechanism is inserted in the hole of the spindle, the pin 25 of means 26 for the blocking of the outer casing is automatically inserted in the seat 10.

By means of an apparatus according to the invention, a full automation of whatever type of tool machine can be achieved because any operative mechanism may be positioned and blocked always in the same position with respect to the spindle nose, and without the need of carrying out any modification to the machine; this also allows for the optimization of work times and production costs.

Practically, the construction details may vary in whatever equivalent manner as far as the shape, dimensions, elements disposition, nature of used materials without nevertheless coming out from the scope of the adopted solution and thus remaining within the scope of the invention.

While specific embodiments of the invention have been shown and described in detail to illustrate the application of the principles of the invention, it will be understood that the invention may be embodied otherwise without departing from such principles.

What is claimed is:

1. A holder block for a rotatable spindle having a main bore for receiving a generic operating mechanism, comprising a block body formed as an integral unit including:
    a first opening defining a seat for holding the shank of a first tool; a second opening defining a seat for holding the shank of an arm carrying a mechanism and a third opening defining a seat for holding the shank of an arm carrying another mechanism, said mechanism and said another mechanism operating on different fluids, said second opening being connected to a first inwardly extending operating medium bore passage, said third opening being connected to a second inwardly extending operating medium bore passage, each of said first, second, and third openings having a center lying on a circumferential line concentric with a central axis of the spindle.

2. A holder block according to claim 7, including an accessory operating mechanism having a pin engageable in the first opening of the holder block.

3. A holder block according to claim 2, wherein at least one of said seats is a truncated conical shape to allow positioning of a milling angle head stock.

4. A holder block according to claim 2, wherein said block includes conduits extending transversely to said bores and being open at an end face of said block for accommodating a connecting pipe and including a connecting pipe fitted into said opening.

5. A holder block according to claim 4, wherein said conduit openings include a sealing valve ball with a spring biasing said ball into a closed position to engage a pin of the operating mechanism cooperating with said ball to open a passage therethrough.

6. A tool machine comprising a rotatable spindle having a main bore, a generic operating mechanism engaged in said main bore, a block member fixed on the end face of said machine extending across said spindle at a spaced location from said main bore and having a front block face with a first inwardly extending bore passage, a second inwardly extending bore passage and a third inwardly extending bore passage, each inwardly extending bore passage defining an inwardly extending recessed seat, said seats defining accessory mechanism receiving openings for a shank of an accessory mechanism which is to be associated with said generic operating mechanism, said block having a side face with first and second delivery bores connected to said second and third inwardly extending bore respectively and including check valve means between respective said bores and corresponding inwardly extending bore, said inwardly extending bores each having a central axis lying on a circumferential line concentric with a central axis of said spindle.

7. A holder block according to claim 1, wherein said mechanism operates with lubricant, said first inwardly extending operating medium passage being connectable with a lubricant supply connected to a face of said block which differs from a block face defining said openings.

8. A holder block according to claim 7, wherein said another mechanism operates pneumatically, said second inwardly extending operating medium passage being connectable with an air supply connected to a face of said block which differs from a block face defining said openings.

9. A holder block according to claim 7 wherein said first opening defines a seat for milling angle head tool.

* * * * *